US007924137B2

(12) United States Patent
Rahman et al.

(10) Patent No.: US 7,924,137 B2
(45) Date of Patent: Apr. 12, 2011

(54) BATTERY FUSE ASSEMBLY

(75) Inventors: Naeem Rahman, Bolingbrook, IL (US);
Anthony Czyz, Schaumburg, IL (US);
Cuong Ha, Chicago, IL (US)

(73) Assignee: Cooper Technologies Company,
Houston, TX (US)

( * ) Notice: Subject to any disclaimer, the term of this patent is extended or adjusted under 35 U.S.C. 154(b) by 180 days.

(21) Appl. No.: 11/852,851

(22) Filed: Sep. 10, 2007

(65) Prior Publication Data
US 2009/0066469 A1 Mar. 12, 2009

(51) Int. Cl.
*H01H 85/175* (2006.01)
*H01H 85/08* (2006.01)
(52) U.S. Cl. ......... 337/187; 337/158; 337/159; 337/186
(58) Field of Classification Search .................. 337/158, 337/159, 187, 186
See application file for complete search history.

(56) References Cited

U.S. PATENT DOCUMENTS

| 950,932 | A | * | 3/1910 | Lehmann | 337/186 |
|---|---|---|---|---|---|
| 2,729,802 | A | * | 1/1956 | Jordan et al. | 439/830 |
| 5,120,617 | A | * | 6/1992 | Cameron | 429/7 |
| 5,805,047 | A | | 9/1998 | De Villeroche et al. | 337/290 |
| 6,162,098 | A | * | 12/2000 | Cheng et al. | 439/620.29 |
| 6,294,978 | B1 | * | 9/2001 | Endo et al. | 337/166 |
| 6,448,882 | B1 | * | 9/2002 | Inaba et al. | 337/227 |
| 6,507,265 | B1 | * | 1/2003 | Ackermann | 337/278 |
| 6,509,824 | B2 | * | 1/2003 | Inaba et al. | 337/295 |
| 6,512,443 | B1 | * | 1/2003 | Matsumura et al. | 337/189 |
| 6,576,838 | B2 | * | 6/2003 | Matsumura | 174/66 |
| 6,607,860 | B2 | * | 8/2003 | Hulbert et al. | 429/178 |
| 6,806,421 | B2 | * | 10/2004 | Matsumura | 174/50 |
| 6,855,008 | B1 | * | 2/2005 | Freitag et al. | 439/620.26 |
| 6,902,434 | B2 | | 6/2005 | Stack | 439/621 |
| 6,932,650 | B1 | | 8/2005 | Freitag | 439/621 |
| 7,172,462 | B1 | | 2/2007 | Gronowicz, Jr. | 439/620.26 |
| 7,192,319 | B1 | | 3/2007 | Rahman et al. | |
| 7,488,213 | B2 | * | 2/2009 | Plummer | 439/620.33 |
| 2001/0011939 | A1 | * | 8/2001 | Inaba et al. | 337/265 |
| 2002/0163416 | A1 | * | 11/2002 | Matsumura | 337/112 |
| 2002/0167390 | A1 | * | 11/2002 | Matsumura et al. | 337/161 |
| 2005/0116806 | A1 | * | 6/2005 | Iwata | 337/188 |

OTHER PUBLICATIONS

International Search Report for PCT/US07/20563; Feb. 26, 2008; 7 pages.

* cited by examiner

*Primary Examiner* — Anatoly Vortman
(74) *Attorney, Agent, or Firm* — Armstrong Teasdale LLP

(57) ABSTRACT

A fuse includes a fusible element and a body member encased within a heat-resistant housing. The fusible element is configured to open an electrical circuit coupled to a storage battery in response to an over-current in the electrical circuit. The housing is configured to contain an arc generated by the fusible element in response to the over-current and to shield the arc and the fusible element from ambient particles. Thus, the fuse is ignition protected. The body member includes an insulating material configured to interrupt the arc. The housing includes an opening configured to receive a terminal of the storage battery or a terminal of a mounting plate. An insulating material disposed about a first end of the mounting plate terminal is configured to electrically isolate the fuse and a power supply cable in the electrical circuit from the mounting plate terminal.

27 Claims, 4 Drawing Sheets

BATTERY FUSE ASSEMBLY

TECHNICAL FIELD

The invention relates generally to fuse assemblies, and more particularly, to fuse assemblies for storage batteries.

BACKGROUND OF THE INVENTION

Fuses are widely used as over-current protection devices for preventing damage to electrical circuits. Fuses include fuse terminations configured to form an electrical connection between an electrical power source and an electrical component or a combination of electrical components or loads arranged in an electrical circuit. Fuses also include one or more fusible links or elements disposed between the fuse terminations. When electrical current through a fuse exceeds a predetermined limit, the fusible elements melt, disintegrate, fail, or otherwise open to break an electrical and open the electrical circuit associated with the fuse, thereby preventing damage to the electrical components in the circuit.

In vehicle electrical systems, storage batteries or power sources such as alternators are used to power electrical circuits. Typically, a storage battery includes a terminal post configured to receive a ring terminal of an electrical cable in an electrical circuit. Sometimes, a fuse is fitted over the terminal post to protect the components of that electrical circuit from excess current. Alternatively, the fuse is sometimes fitted over a mounting stud of a mounting plate coupled to the terminal post. A nut is fitted over the terminal post or mounting stud to maintain the positions of the ring terminal and fuse relative to the terminal post or mounting stud.

Known arrangements of these types may be susceptible to undesirable shorting or bypassing of the current path through the fuse if the ring terminal is inadvertently brought into contact with the terminal post or mounting stud, creating a direct current path from the terminal post or mounting stud to the ring terminal, without first passing through the fuse. Thus, despite the presence of the fuse in the circuit, component damage may result.

Traditionally, an insulating nut has been fitted over the terminal post or mounting stud to electrically isolate the fuse and the ring terminal and thereby prevent current from circumventing the fuse. A consumer who is unaware of, or unconcerned with, this important function of the insulating nut may replace the insulating nut with a less expensive, standard nut. The standard nut will not prevent current from circumventing the fuse and thereby causing component damage.

FIG. 1 is a perspective view of a conventional fuse 10 for storage batteries. The fuse 10 includes a cubical-shaped member 15 having a fusible element 20 therein. The term "cubical" is used herein to refer to any 3-dimensional member with rectangular sides. The fusible element 20 includes a fault element 20a configured to melt, disintegrate, fail, or otherwise open to break an electrical circuit (not shown) coupled to the fuse, in response to an over-current in the circuit. A transparent cover 25 is coupled to the cubical-shaped member 15, on a side of the cubical-shaped member 15 proximate to the fault element 20a. The transparent cover 25 allows for visual inspection of the fault element 20a.

An aperture 30 is disposed between the fault element 20a and the cover 25. Ambient air and other particles (hereinafter, "ambient particles") may travel through the aperture 30 and deposit on the fault element 20a. Such deposits can significantly degrade the performance of the fault element 20a. The degradation is especially prevalent in marine applications, where the ambient particles include water particles, minerals, etc. For example, the water and mineral particles can cause the fault element 20a to rust. The aperture 30 also prevents the fuse 10 from being ignition protected, as a spark from the fault element 20a, such as an electric arc caused by an over-current, can ignite a fuel/air mixture in the ambient particles.

Therefore, a need exists in the art for a battery fuse assembly with an improved means for preventing electrical circumvention of the fuse. Another need exists in the art for the fault element of the fuse to be protected from degradation by the ambient particles. A further need exists in the art for the fuse to be ignition protected.

SUMMARY OF THE INVENTION

The invention provides a battery fuse assembly with an improved means for preventing electrical circumvention of a fuse. The fuse includes a housing configured to protect a fusible element of the fuse from exposure to ambient particles. By shielding the fusible element from ambient particles, the housing protects the fusible element from degradation due to rust, corrosion, etc. Thus, the fuse can safely and reliably be used in marine (and other) applications. The housing also contains fuse element particles within the housing under fault loads.

In one aspect of the invention, the fuse includes a housing having a body member and a fusible element encased therein. For example, the housing can have a substantially cubical shape. The fusible element includes a fault element configured to melt, disintegrate, fail, or otherwise open to break an electrical circuit that will be coupled to the fuse, in response to an over-current in the circuit. The housing includes a heat-resistant plastic or another heat-resistant material, such as Polyphenylene Sulfide, configured to contain an arc generated by the fault element in response to the over-current in the circuit. The material is configured to prevent the arc from mixing with ambient particles, thereby making the fuse ignition protected.

The housing also is configured to shield the fusible element from ambient particles, thereby increasing the expected long-term performance of the fusible element. For example, by shielding the fusible element from water and other ambient particles, the housing can protect the fusible element from degradation due to rust, corrosion, etc.

The body member includes an insulating material, such as a ceramic. The insulating material is configured to interrupt the arc generated by the fault element in response to the over-current. The body member includes an upper surface, a lower surface, and a side surface. The fusible element is substantially disposed about the side surface and includes an upper portion that engages at least a portion of the upper surface, a lower portion that engages at least a portion of the lower surface, and the fault element that engages the side surface of the body member. In certain exemplary embodiments, a surface of the fault element can include a layer of electrically non-conductive plastic, such as Silicone. Tests have shown that application of such a plastic layer can prevent long arcing duration, which is otherwise common during a high voltage over-current.

The upper portion of the fusible element engages a ring terminal disposed proximate an upper surface of the housing. The lower portion of the fusible element engages another ring terminal disposed proximate a lower surface of the housing. In use, power from a battery can travel through a post terminal or mounting stud to the ring terminal proximate the lower surface of the housing, through the lower portion of the fusible element to the fault element, through the upper portion of the fusible element to the ring terminal proximate the upper surface of the housing, and through a power supply cable ring collar to an electrical circuit or component attached thereto. For example, the fuse can include an opening configured to receive the post terminal or mounting stud.

In another aspect of the invention, a mounting plate includes an improved means for preventing electrical circumvention of the fuse. The mounting plate includes a conductive, elongated body having an upper portion and a lower portion separated by a first member. The upper portion includes an elongated member disposed substantially parallel to the lower portion and a second member disposed substantially perpendicular to the lower portion and substantially parallel to the first member. The elongated member is disposed between the first member and the second member.

The lower portion of the mounting plate body includes a terminal bore configured to receive a terminal post of a battery. A threaded mounting stud extends through the upper portion of the mounting plate body, in a direction substantially perpendicular to the upper portion. The mounting stud is configured to receive a fuse and a power supply cable in an electrical circuit. The body of the mounting plate is configured to transmit current from the terminal post to the mounting stud for transmission to the fuse and the power supply cable. In certain exemplary embodiments, the second member is configured to act as an anti-rotation stop for preventing movement of the fuse relative to the upper portion of the body of the mounting plate.

An insulating material is disposed about a first end of the mounting stud. A portion of the insulating material extends beneath a lower surface of the upper portion of the mounting plate body, between a plane of the first member and a plane of the second member. Another portion of the insulating material extends radially about a circumference of a portion of the mounting stud, proximate an upper surface of the upper portion of the mounting plate body. Another portion of the insulating material extends along a substantially central length of the second member.

The insulating material is configured to electrically isolate the fuse and the power supply cable from the mounting stud, and is intended to prevent current flow from the mounting stud to the power supply cable from circumventing the fuse, without the need for an insulating nut.

These and other aspects, features and embodiments of the invention will become apparent to a person of ordinary skill in the art upon consideration of the following detailed description of illustrated embodiments exemplifying the best mode for carrying out the invention as presently perceived.

DETAILED DESCRIPTION OF EXEMPLARY EMBODIMENTS

The following description of exemplary embodiments refers to the attached drawings, in which like numerals indicate like elements throughout the several figures.

Figure 2:
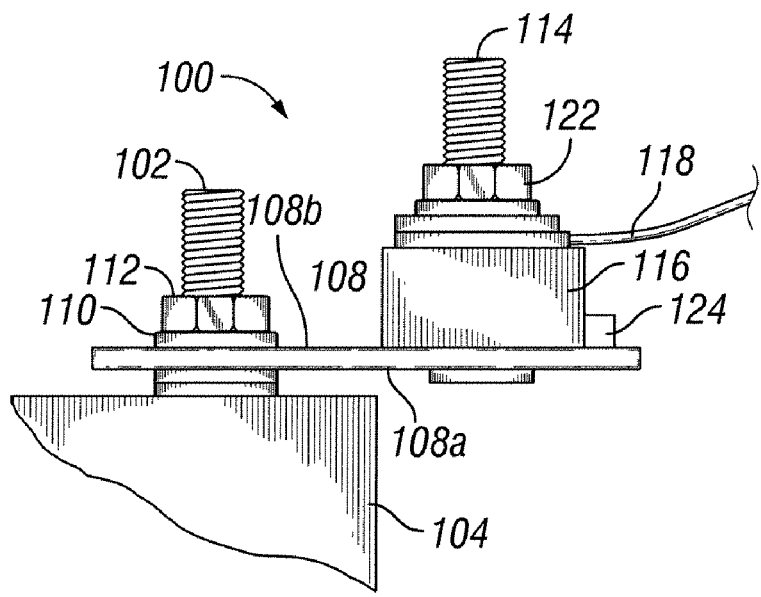
FIG. 2 is an elevational view of a battery fuse assembly coupled to a terminal post of a battery, in accordance with certain exemplary embodiments.

FIG. 2 is an elevational view of a battery fuse assembly 100 coupled to a terminal post 102 of a battery 104, in accordance with certain exemplary embodiments. The battery 104 is a storage battery configured to power one or more electrical circuits and/or components of a vehicle, such as an automobile or boat. As the construction and operation of such a battery 104 is readily appreciated by a person skilled in the art, further discussion thereof is omitted. For example, the terminal post 102 can include a positive or negative terminal of the battery 104.

A conductive mounting plate 108 (i.e., a bus bar) of the battery fuse assembly 100 is attached to the terminal post 102 via a fastener, such as a washer 110 and nut 112 with threaded engagement. The mounting plate 108 includes an elongated body 108a that extends substantially perpendicularly from the terminal post 102. A threaded mounting stud 114 extends from an end of the elongated body 108a, in a direction substantially parallel to the terminal post 102. The mounting plate 108 is configured to transmit current from the terminal post 102 to the mounting stud 114.

The mounting stud 114 is configured to receive a fuse 116 for protecting a power supply cable 118 electrically connected to the fuse 116. For example, the power supply cable 118 can supply electrical power from the battery 104 (via the terminal post 102, the mounting plate 108, and the mounting stud 114) to a vehicle starter motor (not shown).

An insulating nut 122 coupled to mounting stud 114 maintains the positions of the power cable 118 and fuse 116 relative to the mounting stud 114. For example, the insulating nut 122 can prevent movement of the power cable 118 and fuse 116 that otherwise would occur due to engine or vehicle vibration. The mounting plate 108 further includes an anti-rotation stop 124 projecting upwardly from a surface 108b of the mounting plate 108 to prevent movement of the fuse 116 relative to the mounting plate 108. The insulating nut 122 electrically isolates the fuse 116 and the power supply cable 118 from the mounting stud 114, and is intended to prevent current flow from the mounting stud 114 to the power supply cable 118 from circumventing the fuse 116.

The fuse 116 includes a fusible link or fusible element that is configured to melt, disintegrate, fail, or otherwise open to break an electrical circuit through the fuse 116. In normal operation, power drawn from the battery 104 flows through the mounting plate 108 and through the fuse 116 to the power cable 118 to one or more electrical circuits and/or components. When current flow through the fuse 116, or more specifically, when current flow through the fusible link or fusible element of the fuse 116, approaches a predetermined level, the fusible link or element opens the circuit through the fuse 116 and thereby prevents damaging current flow to the power supply cable 116 and the circuits and/or components connected thereto. The components and operation of the fuse 116 are described in more detail below, with reference to FIGS. 5-7.

Figure 1:
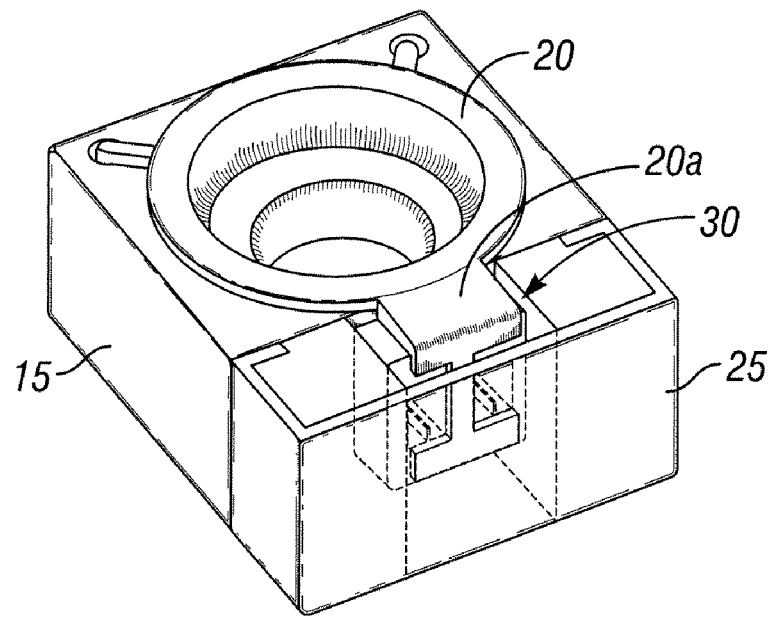
FIG. 1 is a perspective view of a conventional fuse.
Figure 3:
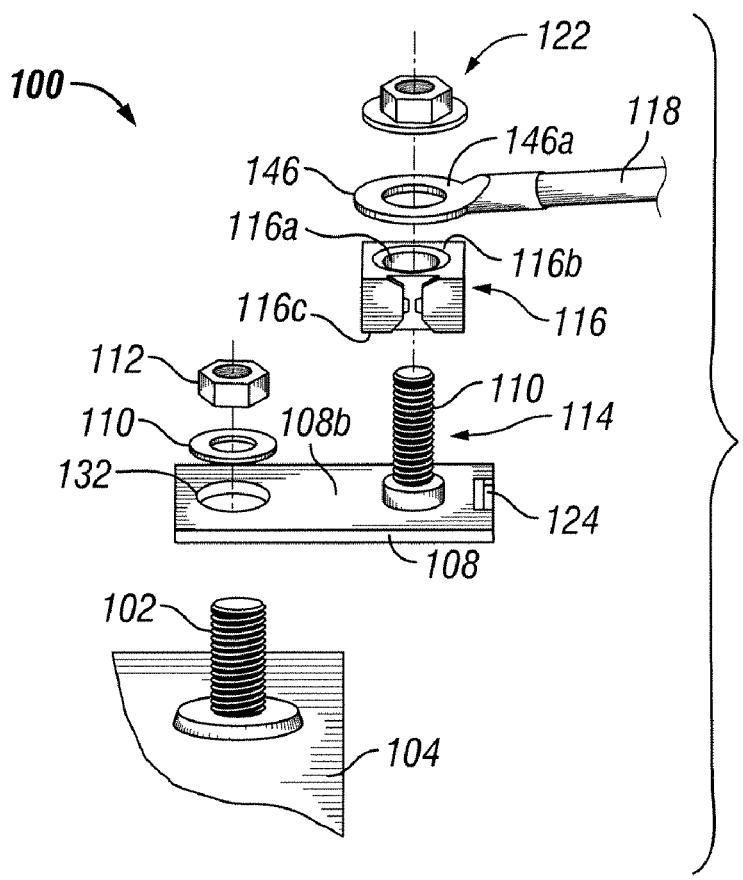
FIG. 3 is an exploded view of the battery fuse assembly and the terminal post of the battery shown in FIG. 2.

FIG. 3 is an exploded view of the battery fuse assembly 100 and the terminal post 102 of the battery 104 shown in FIG. 2, and whereby an exemplary method of assembling the battery fuse assembly 100 and terminal post 102 is described. The mounting plate 108, with attached mounting stud 114, is attached to the terminal post 102 of the battery 104 by inserting the terminal post 102 through a terminal bore 132 in the mounting plate 108. Once the terminal post 102 is received in the terminal bore 132, the mounting plate 108 is attached to the terminal post 102 with the washer 110 and nut with threaded engagement, as shown in FIG. 1.

Once the mounting plate 108 is attached to the terminal post 102, the fuse 116 is inserted over the mounting stud 114, and the mounting stud 114 is passed through a substantially central opening 116a in the fuse 116, until a lower bearing surface 116c of the fuse 116 contacts the surface 108b of the mounting plate 108 and the fuse 116 is seated upon the mounting plate 108, adjacent the anti-rotation stop 124. The lower bearing surface 116c of the fuse 116 includes a ring terminal 520b configured to engage the ring collar surface 108b of the mounting plate 108, as described below with reference to FIGS. 5-7. A ring collar 146 of the power cable 118 is then inserted over the mounting stud 114 and in contact with an upper bearing surface 116b of the fuse 116. The upper bearing surface 116b includes a ring terminal 520 configured to engage the ring collar 146, as described below with reference to FIGS. 5-7. The insulating nut 122 is then threaded about the mounting stud 114 until it contacts an upper surface 146a of the ring collar 146. The insulating nut 122 is tightened to securely fasten the ring collar 146, fuse 116, and mounting plate 108. When assembled, current flows from the terminal post 102, through the mounting plate 108 to the fuse bearing surface 116c, through the fuse 116 to the fuse bearing surface 116b, and through the ring collar 146 to the power cable 116b and the circuits and/or components connected thereto.

Figure 4:
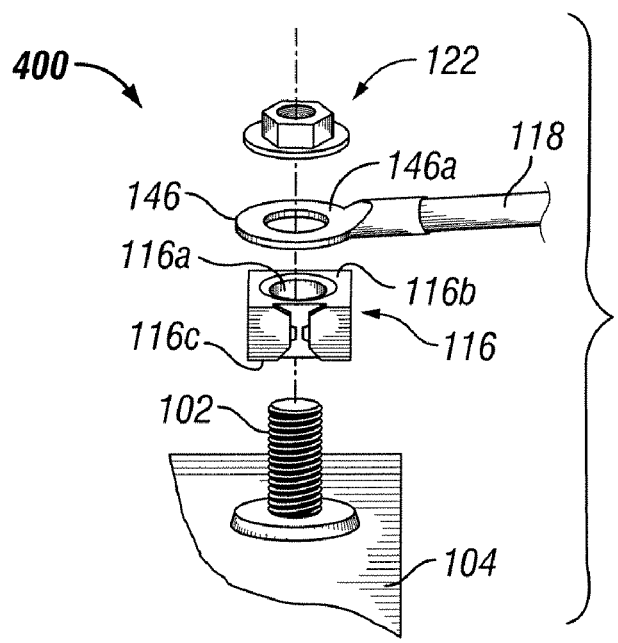
FIG. 4 is an exploded view of a fuse, a power cable, and a terminal post of a battery, in accordance with certain alternative exemplary embodiments.

FIG. 4 is an exploded view of an assembly 400 of the fuse 116, the power cable 118, and the terminal post 102 of the battery 104, in accordance with certain alternative exemplary embodiments. Unlike the assembly 100 described above in connection with FIGS. 2 and 3, the assembly 400 depicted in FIG. 4 does not include a mounting plate for receiving the fuse 116 and the power cable 118. Rather, the fuse 116 and power cable 118 are connected directly to the terminal post 102 of the battery 104.

Specifically, the fuse 116 is inserted over the terminal post 102, and the terminal post 102 is passed through the central opening 134 in the fuse 116, until the lower bearing surface 116c of the fuse 116 contacts an upper surface 104a of the battery 104 and the fuse 116 is seated upon the battery 104. The ring collar 146 of the power cable 118 is inserted over the terminal post 102 and in contact with the upper bearing surface 116b of the fuse 116. The insulating nut 122 is threaded about the terminal post 102 until it contacts the upper surface 146a of the ring collar 146. The insulating nut 122 is tightened to securely fasten the ring collar 146, fuse 116, and battery 104. When assembled, current flows from the terminal post 102, through the fuse bearing surface 116c, through the fuse 116 to the fuse bearing surface 116b, and through the ring collar 146 to the power cable 116b and the circuits and/or components connected thereto.

Figure 5:
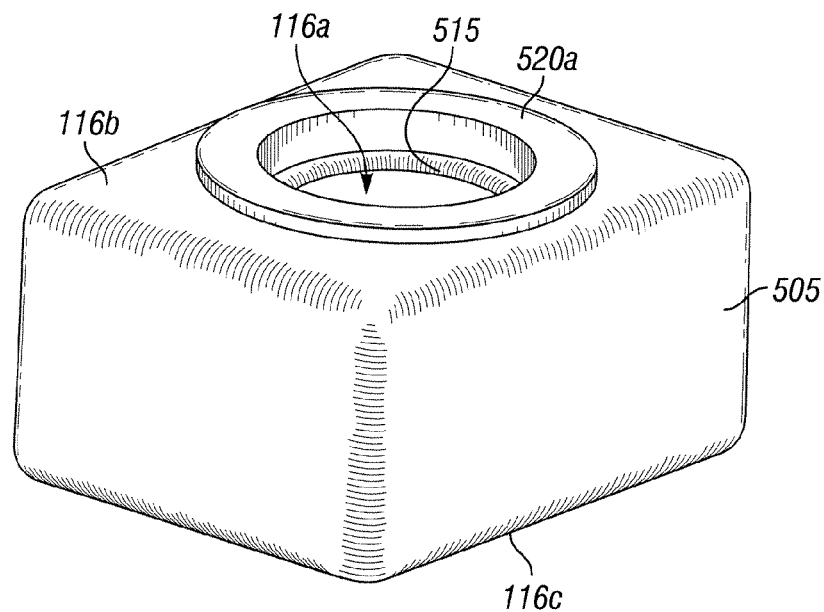
FIG. 5 is a perspective view of a fuse, in accordance with certain exemplary embodiments.
Figure 6:
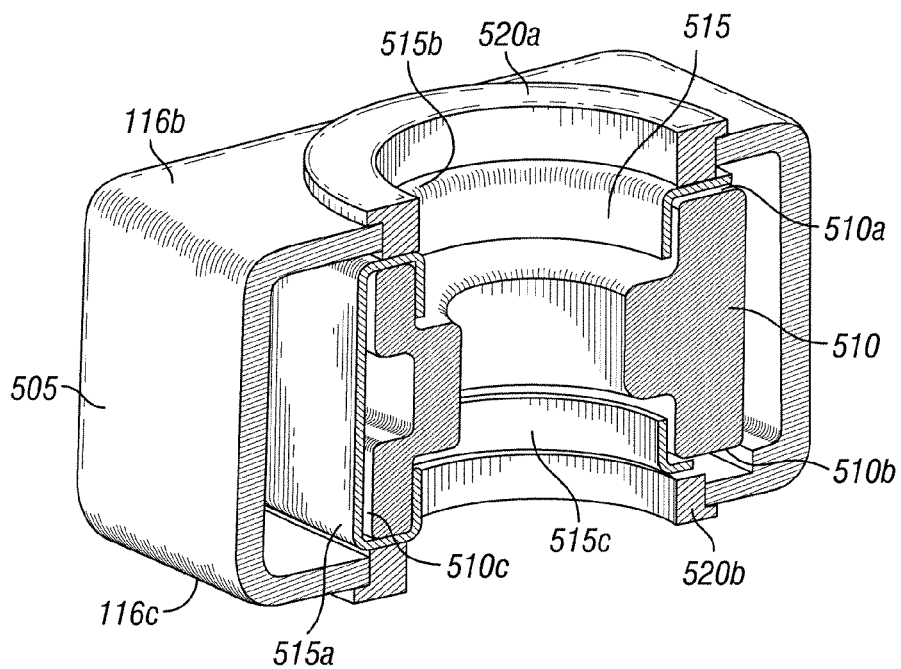
FIG. 6 is a perspective cross-sectional side view of the fuse shown in FIG. 5.
Figure 7:
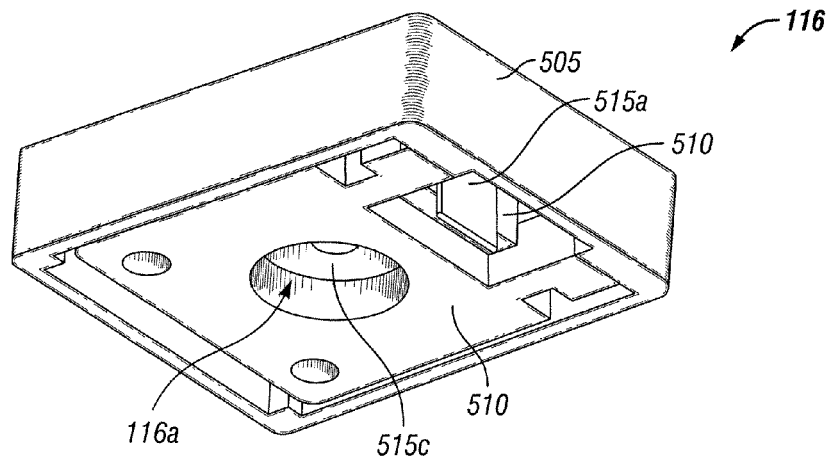
FIG. 7 is a perspective cross-sectional bottom view of the fuse shown in FIG. 5.

FIG. 5 is a perspective view of the fuse 116, in accordance with certain exemplary embodiments. FIG. 6 is a perspective cross-sectional side view of the fuse 116. FIG. 7 is a perspective cross-sectional bottom view of the fuse 116.

With reference to FIGS. 5-7, the fuse 116 includes a substantially cube-shaped housing 505 having a body member 510 and a fusible element 515 encased therein. The fusible element 515 includes a fault element 515a configured to melt, disintegrate, fail, or otherwise open to break an electrical circuit (not shown) coupled to the fuse 116, in response to an over-current in the circuit.

The housing 505 includes an upper surface 116b and a lower surface 116c of the fuse 116. The lower surface 116c includes a ring terminal 520b configured to engage a surface of a battery (not shown) or a mounting plate (not shown) connected to a battery, as described above with reference to FIGS. 3-4. The upper surface 116b includes a ring terminal 520a configured to engage a surface of a power cable ring collar (not shown), as described above with reference to FIGS. 3-4. The housing 505 and the elements contained therein include a substantially central opening 116a configured to engage a battery terminal post or a mounting stud, as described above with reference to FIGS. 3-4. In certain exemplary embodiments, the ring terminals 520 are configured to tightly engage the mounting plate, battery, and/or power cable ring collar so that the central opening 116a is exposed to little or no ambient during operation.

The housing 505 includes a heat-resistant material, such as Polyphenylene Sulfide. In certain exemplary embodiments, the housing 505 is at least partially transparent to allow for visual inspection of the fault element 515a. The housing 505 is configured to contain an arc generated by the fault element 515a in response to an over-current in the circuit. The housing 505 prevents the arc from mixing with ambient particles, thereby making the fuse 116 ignition protected.

The housing 505 also is configured to shield the fusible element 515 from ambient particles, thereby increasing the expected long-term performance of the fusible element 515. By shielding the fusible element 515 from water and other ambient particles, the housing 505 protects the fusible element 515 from degradation due to rust, corrosion, etc. Thus, the fuse 116 can safely and reliably be used in marine (and other) applications.

The body member 510 includes an insulating material, such as a ceramic. The insulating material is configured to interrupt the arc generated by the fault element 515a in response to an over-current. The body member 510 includes an upper surface 510a, a lower surface 510b, and a side surface 510c. The fusible element 515 is substantially disposed about the side surface 510c and includes an upper portion 515b that engages at least a portion of the upper surface 510a, a lower portion 515c that engages at least a portion of the lower surface 510b, and the fault element 515a that engages the side surface 510c of the body member 510. The structure of the fusible element 515 is described in more detail below, with reference to FIGS. 8-10.

The upper portion 515b of the fusible element 515 engages the ring terminal 520a. The lower portion 515c of the fusible element engages the ring terminal 520b. Thus, in use, power from a battery travels through a post terminal or mounting stud to the ring terminal 520b, through the lower portion 515c of the fusible element 515 to the fault element 515a, through the upper portion 515b of the fusible element 515 to the ring terminal 520a, and through a power supply cable ring collar to an electrical circuit or component attached thereto.

Figure 8:
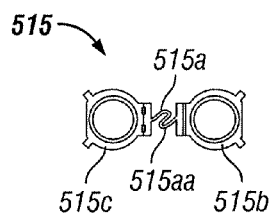
FIG. 8 is a top plan view of a fusible element of a fuse, in accordance with certain exemplary embodiments.
Figure 9:
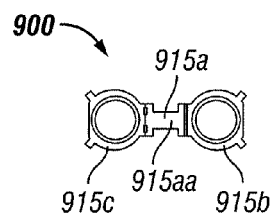
FIGS. 9-10 are top plan views of fusible elements of a fuse, in accordance with certain alternative exemplary embodiments
Figure 10:
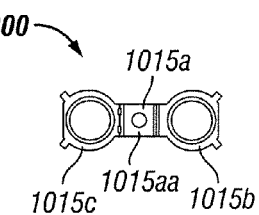

FIG. 8 is a top plan view of a fusible element 515 of a fuse, in accordance with certain exemplary embodiments. FIGS. 9-10 are top plan views of fusible elements 900 and 1000, in accordance with certain alternative exemplary embodiments. With reference to FIGS. 5-10, each fusible element 515, 900, 1000 includes a substantially circular upper portion 515b, 915b, 1015b and a substantially circular lower portion 515c, 915c, 1015c disposed on opposite sides of a fault element 515a, 915a, 1015a. Each upper portion 515b, 915b, 1015b is configured to engage at least a portion of an upper surface 510a of a body member 510 of the fuse 116. Each lower portion 515c, 915c, 1015c is configured to engage at least a portion of a lower surface 510b of the body member 510 of the fuse 116. Each fault element 515a, 915a, 1015a is configured to engage at least a portion of a side surface 510c of the body member 510.

In certain exemplary embodiments, at least one surface 515aa, 915aa, 1015aa of a fault element 515a, 915a, 1015a can include a layer of electrically non-conductive plastic. For example, a thin layer of a polymer of Silicone can be applied to the surface 515aa, 915aa, 1015aa of the fault element 515a, 915a, 1015a. In certain exemplary embodiments, the thickness of the plastic can be between 0.00002 and 0.04 inches. For example, the plastic can be applied to the surface 515aa, 915aa, 1015aa of the fault element 515a, 915a, 1015a by spray, burch, dipping, or another suitable method known to a person of ordinary skill, having the benefit of the present disclosure.

Tests have shown that application of such a plastic layer can prevent long arcing duration, which is otherwise common during a high voltage over-current. In particular, tests have shown that, for a fault element 515a, 915a, 1015a coated with a plastic layer, the maximum current flow after over-current was less than 0.1 mA at interrupt voltage, as compared to 0.5 mA at interrupt voltage for a fault element 515a, 915a, 1015a that was not coated with a plastic layer. Thus, the plastic layer coating can increase the voltage and current rating of the fuse 116. In fact, tests have shown that a fault element 515a, 915a, 1015a with a plastic layer coating can meet voltage interrupts up to 58 Vdc and 2000 Amp, 32 Vdc and 5000 Amp, or 14 Vdc and 10000 Amp.

Although FIGS. 8-10 illustrate an "s-shaped" fault element 515a, a "solid link shaped" fault element 915a, and a "solid link with a hole" shaped fault element 1015a, respectively, a person of ordinary skill in the art having the benefit of the present disclosure will recognize that many other suitable fault element shapes exist. In particular, one can alter the thickness, geometry, and/or material of the fault element 515a, 915a, 1015a to vary one or more performance characteristics, such as a resistance, of the fault element 515a, 915a, 1015a.

Figure 11:
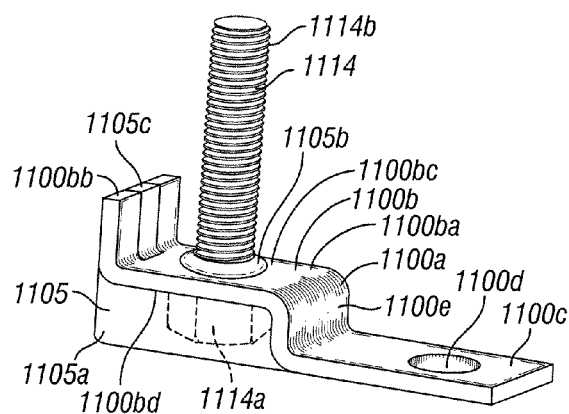
FIG. 11 is a perspective view of a mounting plate of a battery fuse assembly, in accordance with certain alternative exemplary embodiments.

FIG. 11 is a perspective view of a mounting plate 1100, in accordance with certain alternative exemplary embodiments. The mounting plate 1100 includes a conductive, elongated body 1100a having an upper portion 1100b and a lower portion 1100c separated by a member 1100e. The upper portion 1100b includes an elongated member 1100ba disposed substantially parallel to the lower portion 1100c and a member 1100bb disposed substantially perpendicular to the lower portion 1100c and substantially parallel to the member 1100e. The elongated member 1100ba is disposed between the member 1100bb and the member 1100e.

The lower portion 1100c includes a terminal bore 1100d configured to receive a terminal post (not shown) of a battery (not shown). A threaded mounting stud 1114 extends through the upper portion 1100b, in a direction substantially perpendicular to the upper portion 110b. The mounting stud 1114 is configured to receive a fuse (not shown) and a power supply cable (not shown), substantially as described above with reference to FIGS. 2-3. The body 1100a of the mounting plate 1100 is configured to transmit current from the terminal post to the mounting stud 1114 for transmission to the fuse and the power supply cable.

An insulating material 1105 is disposed about a first end 1114a of the mounting stud 1114. A portion 1105a of the insulating material 1105 extends beneath a lower surface 1100bd of the upper portion 1100b of the body 1100a, between a plane of the member 1100bb and the member 1100e. Another portion 1105b of the insulating material 1105 extends radially about a circumference of a portion of the mounting stud 1114, proximate an upper surface 1100bc of the upper portion 1100b of the body 1100a. Another portion 1105c of the insulating material 1105 extends along a substantially central length of the member 1100b. The insulating material 1105 includes a heat-resistant plastic or another heat-resistant material, such as Polyphenylene Sulfide.

Similar to the insulating nut described above with reference to FIGS. 2-3, the insulating material 1105 is configured to electrically isolate the fuse and the power supply cable from the mounting stud 1114, and is intended to prevent current flow from the mounting stud 1114 to the power supply cable from circumventing the fuse. Thus, the mounting plate 1100 of FIG. 11 prevents electrical circumvention of the fuse without requiring an insulating nut.

In certain exemplary embodiments, a standard, non-insulating nut (not shown) is threaded about a second end 1114b of the mounting stud 1114 to maintain the positions of the power cable and the fuse relative to the mounting stud 1114. For example, the standard nut can prevent movement of the power cable and fuse that otherwise would occur due to engine or vehicle vibration. Similarly, the member 1100bb of the mounting plate 1100 can function as an anti-rotation stop for preventing movement of the fuse relative to the upper portion 1100b of the body 1100a of the mounting plate 1100.

In conclusion, the foregoing exemplary embodiments enable a battery fuse assembly. Many other modifications, features, and embodiments will become evident to a person of ordinary skill in the art having the benefit of the present disclosure. It should be appreciated, therefore, that many aspects of the invention were described above by way of example only and are not intended as required or essential elements of the invention unless explicitly stated otherwise. It should also be understood that the invention is not restricted to the illustrated embodiments and that various modifications can be made within the spirit and scope of the following claims.

We claim:

1. A fuse, comprising:
   a housing defining an upper surface and a lower surface, wherein the upper surface includes a first terminal and the lower surface includes a second terminal, and wherein the housing, the first terminal and the second terminal define a central opening extending between the upper and lower surfaces, the central opening configured to receive at least one of a terminal of a storage battery and a stud of a mounting plate associated with the storage battery; and
   a fusible element having an upper portion and a lower portion, the upper portion being engaged to the first terminal and the lower portion being engaged to the second terminal;
   the fusible element further comprising a fault element extending between the upper portion and the lower portion, the fault element configured to open an electrical circuit coupled to the storage battery in response to an over-current in the electrical circuit, wherein the fault element is encased within the housing; and
   wherein the housing comprises an insulating material configured to contain an arc generated by the fault element in response to the over-current in the electrical circuit, shield the fusible element from ambient particles, and prevent the arc from mixing with such ambient particles.

2. The fuse of claim 1, further comprising a body member encased within the housing, wherein the body member is separately provided from the housing and the fusible element.

3. The fuse of claim 2, wherein the body member has an upper surface, a lower surface, and a side surface, and
wherein the fusible element is substantially disposed about the side surface and includes an upper portion that engages at least a portion of the upper surface, a lower portion that engages at least a portion of the lower surface, and the fault element that engages the side surface.

4. The fuse of claim 1, wherein the housing comprises a heat-resistant plastic.

5. The fuse of claim 1, wherein the housing comprises a heat-resistant material selected from the group consisting of: PolyPhenylene Sulfide and Polyethersulfone.

6. The fuse of claim 1, wherein the fault element includes a layer of electrically non-conductive plastic.

7. The fuse of claim 6, wherein the electrically non-conductive plastic comprises Silicone.

8. The fuse of claim 1, wherein the first terminal comprises a ring terminal configured to engage a ring collar of a power supply cable coupled to the electrical circuit.

9. The fuse of claim 1, wherein the fuse has a substantially cubical shape.

10. The fuse of claim 1, wherein the ambient particles comprise water particles.

11. The fuse of claim 1, wherein the fuse is ignition protected.

12. A fuse, comprising:
a single piece housing defining a central opening configured to receive at least one of a terminal of a storage battery and a stud of a mounting plate associated with the storage battery, wherein the single piece housing defines an upper surface and a lower surface, and wherein the upper surface includes a first terminal and the lower surface includes a second terminal, the central opening extending through and between the first and second terminals; and
a fusible element encased within the single piece housing and comprising a fault element configured to open an electrical circuit coupled to the storage battery in response to an over-current in the electrical circuit, the fault element comprising a layer of electrically non-conductive plastic.

13. The fuse of claim 12, wherein the single piece housing comprises a material therein configured to shield the fusible element from ambient water particles.

14. The fuse of claim 12, wherein the single piece housing comprises a member further configured to contain an arc generated by the fault element in response to the over-current in the electrical circuit and to prevent the arc from mixing with ambient particles.

15. The fuse of claim 14, further comprising a body member separately formed from but encased within the single piece housing and comprising an insulating material configured to interrupt the arc.

16. The fuse of claim 15, wherein the body member has an upper surface, a lower surface, and a side surface, and
wherein the fusible element is substantially disposed about the side surface and includes an upper portion that engages at least a portion of the upper surface, a lower portion that engages at least a portion of the lower surface, and the fault element that engages the side surface.

17. The fuse of claim 12, wherein the single piece housing comprises a heat-resistant plastic.

18. The fuse of claim 12, wherein the single piece housing comprises a heat-resistant material selected from the group consisting of: PolyPhenylene Sulfide and Polyethersulfone.

19. The fuse of claim 12, wherein the electrically non-conductive plastic comprises Silicone.

20. The fuse of claim 12, further comprising a ring terminal disposed proximate an upper surface of the single piece housing and configured to engage a ring collar of a power supply cable coupled to the electrical circuit.

21. The fuse of claim 12, wherein the single piece housing has a substantially cubical shape.

22. The fuse of claim 12, wherein the fuse is ignition protected.

23. The fuse of claim 12, wherein the fusible element includes a fault element connected between the first terminal and the second terminal, the fault element being spaced from the central opening and shielded by the single piece housing.

24. The fuse of claim 23, further comprising a body member encased within the single piece housing, wherein the body member is separately provided from the single piece housing and the fusible element.

25. The fuse of claim 24, wherein the body member has an upper surface, a lower surface, and a side surface, and
wherein the fusible element is substantially disposed about the side surface and includes an upper portion that engages at least a portion of the upper surface, a lower portion that engages at least a portion of the lower surface, and the fault element that engages the side surface.

26. The fuse of claim 12, wherein the first terminal comprises a ring terminal configured to engage a ring collar of a power supply cable coupled to the electrical circuit.

27. The fuse of claim 14, wherein the ambient particles comprise water particles.

* * * * *